US005142615A

United States Patent [19]

Levesque et al.

[11] Patent Number: 5,142,615

[45] Date of Patent: Aug. 25, 1992

[54] SYSTEM AND METHOD OF SUPPORTING A PLURALITY OF COLOR MAPS IN A DISPLAY FOR A DIGITAL DATA PROCESSING SYSTEM

[75] Inventors: Pamela L. Levesque, Londonderry; William H. Matthews, Hollis, both of N.H.; Larry D. Seiler, Boylston, Mass.

[73] Assignee: Digital Equipment Corporation, Maynard, Mass.

[21] Appl. No.: 394,498

[22] Filed: Aug. 15, 1989

[51] Int. Cl.[5] .......... G06F 15/62

[52] U.S. Cl. .......... 395/131; 395/160

[58] Field of Search .......... 364/518, 521; 340/703; 395/120, 131, 160

[56] References Cited

U.S. PATENT DOCUMENTS

| | | | |
|---|---|---|---|
| 4,542,376 | 9/1985 | Bass et al. | 340/724 |
| 4,555,775 | 11/1985 | Pike | 364/900 |
| 4,631,690 | 12/1986 | Corthout et al. | 395/120 |
| 4,642,790 | 2/1987 | Minshull et al. | 364/900 |
| 4,700,320 | 10/1987 | Kapur | 364/521 |
| 4,769,762 | 9/1988 | Tsujido | 364/521 |
| 4,794,389 | 12/1988 | Luck et al. | 340/747 X |
| 4,815,010 | 3/1989 | O'Donnell | 364/521 |
| 4,972,315 | 11/1990 | Yamasaki et al. | 364/200 |

*Primary Examiner*—Gary V. Harkcom
*Assistant Examiner*—Mark K. Zimmerman
*Attorney, Agent, or Firm*—Fish & Richardson

[57] ABSTRACT

A display arrangement in a digital data processing system having an interface for controlling the display of hierarchically arranged display objects, each having associated display criteria, in response to a hierarchically-arranged layer control arrangement. The interface comprises a display criteria testing portion for determining the display criteria for each object, and a layer hierarchy control portion for controlling the creation of said layer control arrangement in response to the display criteria determined by the display criteria testing portion.

3 Claims, 2 Drawing Sheets

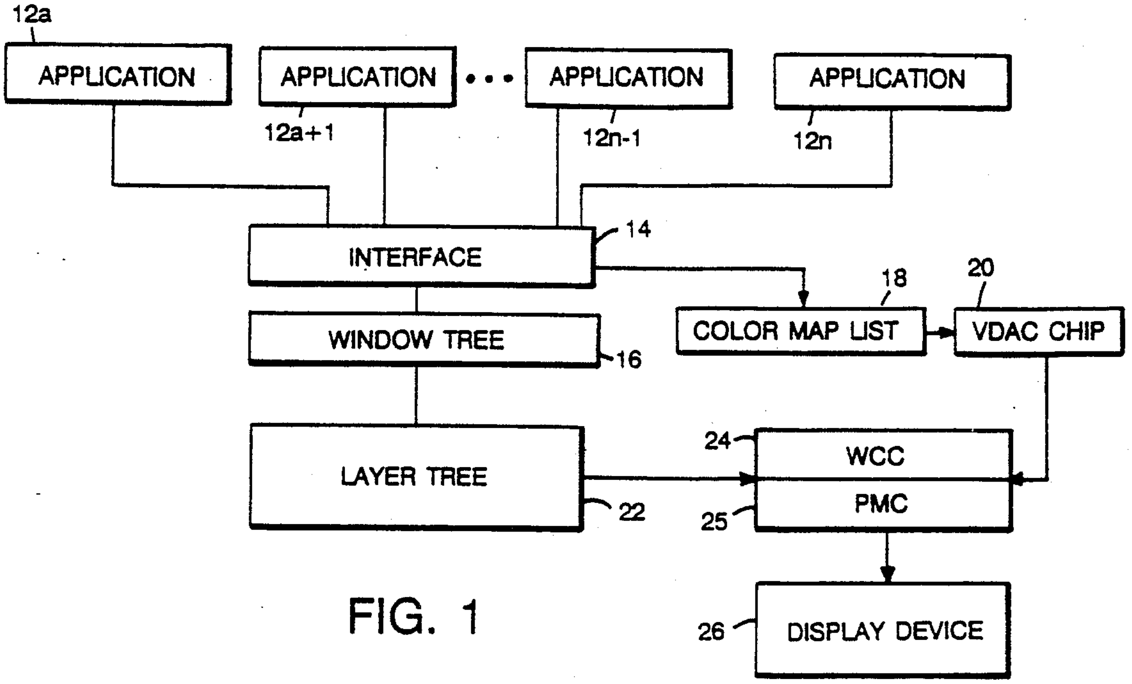
FIG. 1
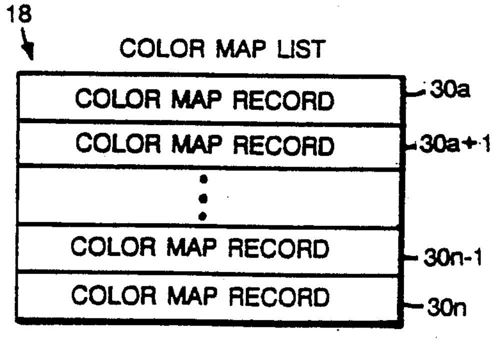
FIG. 2a
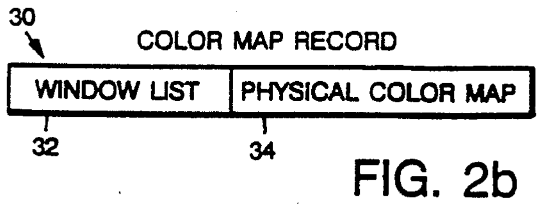
FIG. 2b
FIG. 2c
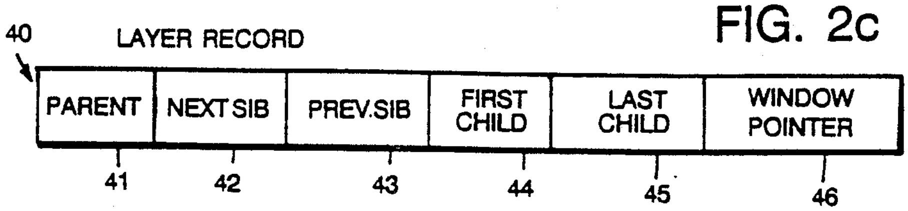
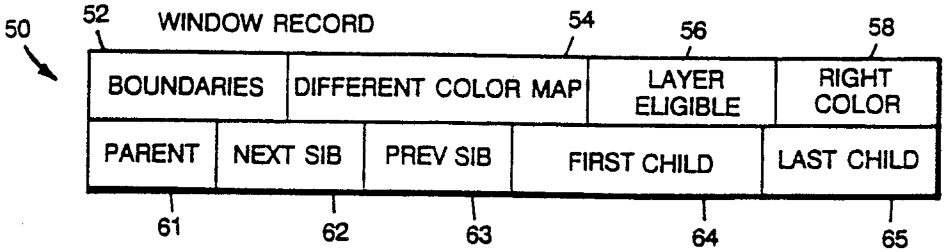
FIG. 2d

SYSTEM AND METHOD OF SUPPORTING A PLURALITY OF COLOR MAPS IN A DISPLAY FOR A DIGITAL DATA PROCESSING SYSTEM

FIELD OF THE INVENTION

The invention relates generally to the field of digital data processing systems, and more specifically to digital data processing systems that support multiple windows.

BACKGROUND OF THE INVENTION

A digital data processing system includes three basic elements, namely, a processor, a memory, and an input/output (I/O) system. The memory stores information in addressable storage locations. This information includes data and instructions for processing the data. The processor fetches information from the memory, interprets the information as either an instruction or data, processes the data in accordance with the instructions, and returns the processed data to the memory for storage therein. The I/O system under control of the processor, also communicates with the memory to transfer information, including instructions and data to be processed, to the memory, and to obtain processed data from the memory. Typically, the I/O system includes a number of diverse types of units, including video display terminals, printers, interfaces to public telecommunications network, and secondary storage devices, including disk and tape storage devices.

Further, a digital data processing system as described above can support a number of different programs executing in such a way that each uses the processor and I/O system to display data on a video display terminal simultaneously in a number of different "windows", i.e., separate rectangular areas of the video display screen. Additionally, this data can be displayed in different colors within different windows.

A color lookup table, or colormap, is commonly used to provide color data values from the processor to a video digital to analog converter (VDAC) device and then to the I/O system so that the data values are displayed as color on the video display terminal.

Typically, a data processing system capable of providing color displays uses a single colormap, usually having 256 colors, which is shared by all programs. The single colormap can be allocated or shared in several ways. For example, the MIT X Window System (TM) uses an allocation policy whereby the last application to request the colormap receives exclusive use of it. That application can, therefore, define the colors of the various pixels (individual picture elements or dots on the display screen) for its own purposes, and, in the process, cause the pixels in windows created by other application to display in unpredictable colors. In other examples, applications can request some but not all of the entries in the colormap.

Typically, however, a single colormap cannot meet the color needs of all of the windows generated by the applications concurrently processed by the system. While some applications are designed to use colors common to other applications rather than using unique colors, other applications are designed to use unique colors and end up monopolizing the colormap, causing windows in other applications to display in unpredictable colors.

Copending applications: Ser. No. 206,203, filed Jun 13 1988, now U.S. Pat. No. 5,058,041; Ser. No. 206,026, filed Jun. 13 1988; Ser. No. 206,194, filed Jun. 13, 1988 now U.S. Pat. No. 4,929,889; Ser. No. 206,030, filed Jun. 13, 1988; Ser. No. 206,031, filed Jun. 13, 1988; Ser. No. 213,197, filed Jun. 29, 1988; Ser. No. 211,778, filed Jun. 27, 1988; Ser. No. 212,819, filed Jun. 29, 1988 now U.S. Pat. No. 5,001,469; and Ser. No. 212,834, filed Jun. 29, 1988 now U.S. Pat. No. 5,038,300 each describe hardware chips having several capabilities including support of multiple windows and colormaps and are herein incorporated by reference. The chips facilitate the display of up to 1024 colors, that is, they contain a colormap which has 1024 entries, with each entry defining a color that will be displayed in response to a pixel value that identifies the entry. The map may be divided into a plurality of groups which can effectively create several independent colormaps of an arbitrary size. The chips also provide up to 64 hardware layers that define windows, that is, overlapping rectangular areas of the screen, which use the colormaps.

SUMMARY OF THE INVENTION

The present invention provides a display arrangement in a digital data processing system having an interface for controlling the display of hierarchically arranged display objects, each having associated display criteria, in response to a hierarchically-arranged layer control arrangement. The interface comprises a display criteria testing portion for determining the display criteria for each object, and a layer hierarchy control portion for controlling the creation of the layer control arrangement in response to the display criteria determined by the display criteria testing portion. The invention provides an interface program for enabling a digital data processor to control the display of hierarchically arranged display objects, each having associated display criteria, in response to a hierarchically-arranged layer control arrangement. The interface program comprises a display criteria testing module for enabling the processor to determine the display criteria for each object, and a layer hierarchy control module for enabling the processor controlling the creation of the layer control arrangement in response to the display criteria determined during processing in response to the display criteria testing module. And, finally, the invention provides a method of controlling an interface in a digital data processing program to control the display of hierarchically arranged display objects, each having associated display criteria, in response to a hierarchically-arranged layer control arrangement. The method comprises the steps of determining the display criteria for each object, and controlling the creation of the layer control arrangement in response to the display criteria determined by the display criteria testing portion.

BRIEF DESCRIPTION OF THE DRAWINGS

FIG. 1 shows the components of a system according to the present invention.

Figure 3:
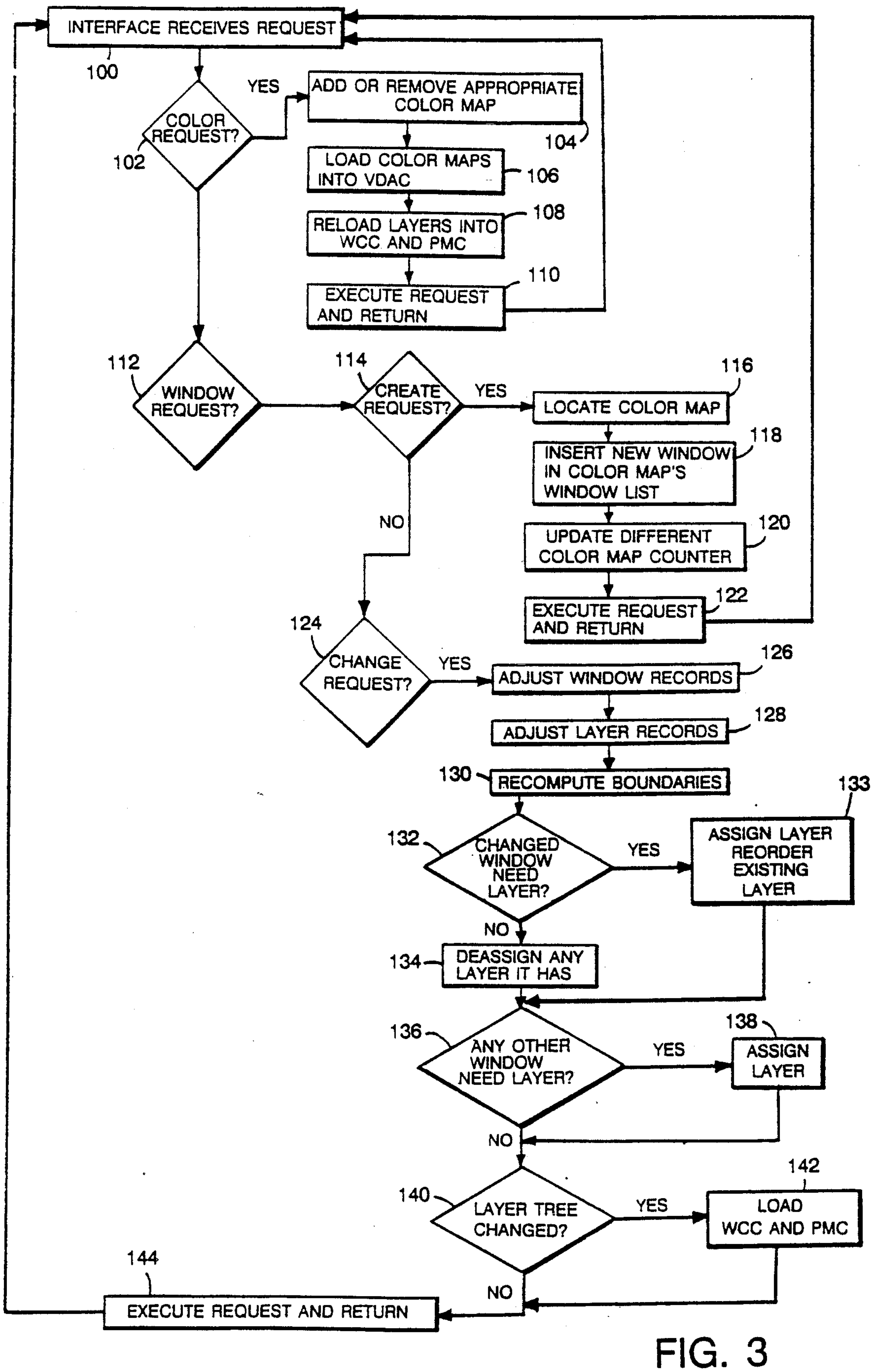

FIGS. *2a–2d* show various data structures used in the system.

FIG. 3 shows a flowchart depicting the general operation of the system.

DESCRIPTION OF A PREFERRED EMBODIMENT

The present invention provides a display system in which multiple windows may employ multiple colormaps, thereby facilitating use of different sets of colors by application using the windows. Specifically, an application, when it "paints" a window, provides pixel data values for each pixel in the window. Each pixel data value identifies, among other things, a color in a colormap, and the display system controlling the window uses the pixel data values and the colormap to identify the colors to be displayed. According to the invention, the display system maintains a window tree comprising a set of window records, one for each window displayed by the system, and a layer tree which includes nodes that define the set of colors used for the various windows defined by the window tree. The layer tree essentially contains pointers to the window record nodes in the window tree, with the exception that, if windows for window records below a particular window record do not require colormaps which differ from the particular window record, the layer tree does not have any nodes pointing to those outer window records. Otherwise stated, the layer tree is similar in structure to the window tree, to the extent that windows associated with window records require different colormaps than windows associated with window records higher in the window tree. Before proceeding further, a general description of a tree structure is provided. This description is then applied to the window and layer trees of the present invention and, following that, a description of the interaction between the window tree, the layer tree and colormaps is provided.

A tree structure refers to a data structure in which a set of elements, here window records, are ordered by some linear order. Such a structure is generally used when the set of elements to be ordered is too large to be practically managed with indices into an array structure, for example, a list.

Typically, a tree structure is defined as having a number of nodes, each having a number of fields some of which contain data. The tree generally has a single root node which is associated with a number of child nodes (also known as descendants), which are, in turn, associated with a number of child nodes, and so on, until reaching a level of nodes which have no children. These are generally referred to as leaf nodes.

The order of nodes in a tree structure is typically maintained by a number of pointer fields contained in each node. These pointer fields include, a parent field, a first_child field, a last_child field, a previous_sibling field, and a next_sibling field. Taking the case of the root node, that is the root window, the parent pointer is empty or null since the root node is the first node created. If, for example, the root node has three child nodes (A, B, and C), the parent field in each of the child nodes points to the root node.

Continuing the example, the first_child field of the root node points to child node A while the last_child field points to child node C; the previous_sibling field of child node A contains a null value (an empty pointer), as it is the first child node created, while the next_sibling field of child node A points to child node B. The previous_sibling field of child node B points to child node A, as it was the child node that was created after child node A, while the next_sibling field of child node B points to child node C. The previous_sibling field of child node C points to child node B, as it was the child node that was created after child node B, while the next_sibling field of child node C contains a value, as it was the last child node created. The child fields of the nodes A, B, and C contain a null value in this example, since the nodes defined by the respective nodes do not have any relative children.

Operations to traverse a tree structure, that is, to move from one node to another, use the pointers. For example, one way to determine the contents of the data fields in node B, is to begin at the root, follow the first _child pointer to node A, and follow the next _sibling pointer to node B. Other tree operations, for example, adding or deleting a node, likewise involve the proper setting of pointers to maintain the order of the tree. Such operations are well known in the art and are not described in detail here.

Applying the above description of a tree structure to the window tree of the present invention, a window record for a root window, that is, a window which is initially allotted the entire screen display, is first established. Associated with this root window record are a number of child window records, which define child windows that are generated by and occlude sections of the root window. In addition, the child windows may overlap each other and be occluded by own child windows of their own and, thus, are associated with another level of child window records in the window tree.

Since, in the system of the present invention, a window can be defined as an area large enough to occupy the entire display screen or as an area small enough to contain a single menu entry, the number of windows and defined window records is potentially very large, thus justifying the use of a tree structure. However, traversing such a large structure to gather information necessary to assign colormaps, for example, is time consuming.

In order to minimize the number of window records processed by the system in colormapping situations and thus decrease computation time, a set of layer records corresponding to a subset of the window records is kept in a layer tree, which follows the same structure as above, but which includes only records for selected windows. In order to prevent duplication of the data stored in the window records, and, thus, save storage space, the layer records typically contain only pointers to the window records. The criteria for selecting which window records have corresponding layer records is detailed in the description of the preferred embodiment under creation of the layer tree. In addition, incremental changes in the position of the window records in the window tree resulting from changes in the display of their corresponding windows are, of course, reflected in changes to their corresponding layer records. Having established the above concepts, the system and method of the present invention will now be described in detail.

Referring to FIG. 1, a system 10 includes software applications **12*a* through 12*n*, generally referred to by reference numeral 12, which issue requests to an interface 14. The present invention addresses two types of requests, color requests and window requests. The interface 14 determines what type of request is received and what the proper processing of the request is, as described below in connection with FIG. 3. The processing of these requests requires the interface 14 to maintain colormap records 30 (FIG. 2) in a colormap list 18, window records 50 (FIG. 2) in a window tree 16, and layer records 40 (FIG. 2) in a layer tree 22. The colormap list 18 supplies pixel information to a video digital to analog chip (VDAC) 20 and, through the layer tree 22, the window tree 16 supplies window boundary and colormap requirement information to a window cursor chip (WCC) 24 and pixel mapping chip (PMC) 25. Combined, this information is used to create a windowed display on a display device 26**.

Referring to FIGS. 2*a* and 2*b*, in processing a color request, the interface 14 maintains the contents and position of colormap records 30*a*–30*n*, generally referred to by reference numeral 30, in the colormap list 18. Each colormap record 30 contains several fields, most notably a window list field 32, and a physical colormap field 34. The window list field 32 is a list of all windows that use the colormap 30 and can be implemented as an array of pointers to window records 50 of the windows that require the colormap 30 or as a linked list of pointers to those windows. The physical colormap in field 34 supplies the VDAC 20 with requisite pixel mapping information.

Typically, all colormaps 30 requested by the applications 12 are stored in the colormap list 18 with the most recently requested colormap 30 being stored first in the list. However, because it is likely that there will be more colormaps 30 in the colormap list 18 than space in the VDAC 20, not all of the colormaps can be loaded into the VDAC hardware. The most recently requested colormap 30 is guaranteed, while, other colormaps are loaded as there is space in the VDAC 20.

Referring to FIGS. 2*c* and 2*d*, in processing a window request, the interface 14 maintains the contents and position of a number of window records 50 in the window tree 16, one record 50 for each window displayed in the system 10. Each window record 50 has the structure of the window record 50 shown in FIG. 2*c*. The window record 50 contains several fields, including a boundaries field 52, a different colormap field 54, a layer eligible field 56, and a right color field 58. The boundaries field 52 contains information concerning the clipping of the window, that is, its rectangular boundaries when displayed. The different colormap field 54 indicates whether the window associated with the window record 50 requires a different colormap 30 than the window associated with the parent of the window record 50. The layer eligible field 56 indicates whether the window needs a layer record. Finally, the right color field 58 indicates whether the window is assigned a layer in the WCC 24 and PMC 25 and whether its correct colormap 30 is loaded in the VDAC 20. In addition, each window record 50 includes a number of pointer fields necessary to maintaining the order of the tree structure, including a parent field 61, a next sibling field 62, a previous sibling field 63, a first child field 64, and a last child field 65, all of which are defined and maintained as described above.

Because the hardware (VDAC 20, WCC 24, and PMC 25) is limited in the number of colormaps 30 it can display, it is possible that not all of the windows in the system 10 will be displayed using their correct colormap 30. Those that are not displayed using their correct colormap 30, are displayed using the most recently installed colormap 30 as a default. However, in order to maximize the number of windows that will be displayed using the correct colormap 30, the present invention provides the layer tree 22 for distinguishing different colormaps 30 that are required by the different layers of windows. In this arrangement, those windows that share a colormap 30 fall into the same layer of windows. For example, a child window may use the same colormap 30 as its parent and, therefore, does not need a layer of its own. Typically, windows that require a layer use a colormap 30 that is not the default colormap, that is, the most recently installed colormap 30, or they occlude a window that uses another colormap 30.

For each window that requires a layer, the interface 4 maintains a layer record 40 in a layer tree 22 which corresponds to a window record 50 in the window tree 16. Each layer record 40 in the layer tree 22 has the structure of layer record 40 shown in FIG. 2*c*. The layer record 40 contains pointers that define its position in the layer tree 22 and, by extension, the position of its corresponding window in the layered display. Included in the layer record 40 are pointer fields necessary to maintaining the order of the tree structure, including a parent field 41, a next sibling field 42, a previous sibling field 43, a first child field 44, and a last child field 45. Also included in the layer record 40 is a window pointer 46 which points to the window record 50 that corresponds to the layer record.

In the present invention, providing the layer records 40 in the layer tree 22 makes it possible to load information concerning the boundaries of windows and colormap requirements from the window records 50 through the layer records 40 into the WCC 24 and PMC 25 quickly, without having to traverse the window tree 16 and without duplicating data stored in the window records 50. In order to understand how the layer records 40 and window records 50 are related, the following description of the creation of the layer tree 22 is provided.

A layer record 40 in the layer tree 22 is created and maintained based on whether or not the window with which it is associated uses a different colormap 30 than its parent or any of its descendants, that is, the contents of the different colormap field 54 in the window record 50 that corresponds to the layer record 40 are set when the window associated with the window record 50 uses a different colormap than its parent or any of its descendants and cleared when the window uses the same colormap as its parent or all of its descendants. Thus, the contents of the different colormap field 54 are propagated up the branches of the window tree 16 from the child to its parent, from the parent to its parent, and so on until the contents of the root window are set.

A layer record 40 is created in the following way. For example, when a window record 50 is changed, the interface 14 determines if its different colormap field 54 is set. If the different colormap field 54 is set, the interface, by referencing a corresponding location in the layer tree 22, determines if there is a layer record 40 already assigned to the window. If there is no layer record 40 assigned to the window, the interface 14 creates a layer record for the window, inserts the layer record in the layer tree, and sets pointers in the layer record to point to the window record 50. Otherwise, if there is an existing layer record 40 for the window, the interface 14 repositions the layer record in the layer tree 22 so that its position corresponds to the position of the window record 50 in the window tree 16.

Once the layer tree is created, the boundary and colormap requirements along with the loaded physical colormaps in the VDAC chip 20 are then used to display those windows that have corresponding layers in their correct colors on the display device 26. Those windows that do not have layers are displayed in default colors on the display device 26.

The operation of the system 10 will now be described with reference to the data structures in FIGS. 2*a*–2*d* and the flow chart of FIG. 3.

In the system 10, the interface 14 receives a request (step 100) from an application 12. As noted above, the types of requests include color requests and window requests.

In the case of color requests (step 102), the interface 14 adds or removes the appropriate colormap record 30 to or from the colormap list 18 (step 104). When adding a colormap record 30, the interface 14 places the new colormap record 30 at the beginning of the colormap list 18 and adjusts the ordering of the other colormap records 30 accordingly. When removing a colormap record 30, the interface 14 removes the colormap from the colormap list 18 and adjusts the order of the other colormap records 30 accordingly. Because in either case the ordering of the colormap records 30 has changed, the interface 14 reloads the colormap records 30 into the VDAC chip 20 (step 106). Also, since adding or removing a colormap record 30 can upset the definition of layers in the PMC and WCC chips 24, the interface 14 reloads the layer records into the PMC and WCC chips 24 (step 108).

To reload the WCC 24 and PMC 25, the interface 14 begins with the highest layer record 40 in the layer tree 22, that is, the layer record corresponding to the root window record 50 in the window tree 16. Then for each layer record 40, if the layer eligible field 56 in the corresponding window record 50 is set and there is space left in the WCC 24 and PMC 25, the interface 14 locates the correct colormap 30 for the window record 50 or uses the default colormap 30, loads the contents of the boundaries field 52 of the window record 50 into the WCC and PMC, and sets the right color field 58 in the window record 50. Following step 108, the interface 14 executes the request and returns to process the next request (step 110).

Returning to step 100, in the case of window requests (step 112) the interface 14 first determines if the request is a create request, that is, a request to create a new window (step 114). If so, the interface 14 locates the appropriate colormap record 30 in the colormap list 18 (step 116). The window list field 32 of the appropriate colormap 30 contains or points to all window records 50 that use the colormap 30 and the interface 14 adds the new window record 50 to the list, by inserting a pointer to the new window record 50 into the window list (step 118). Next, according to whether or not the new window uses a different colormap than its parent, which is indicated in the interface 14 updates the different colormap field 54 in the new window record 50 (step 120). The interface 14 then executes the request and returns to process the next request (step 122).

Returning to step 112, if the interface 14 receives a window request to change an existing window (step 124), it adjusts the window records 50 in the window tree 16 accordingly (step 126) and adjusts the layer records 40 in the layer tree 22 accordingly (step 128).

Returning now to steps 126 and 128, having adjusted records in the window tree 16 and layer tree 22, the interface 14 next recomputes the boundaries of the windows affected by the request (step 130) and determines if the changed window record 50 needs a layer record 40 (step 132). The window record 50 will need a layer record 40 if it uses a different colormap record 30 than its parent, or if its associated window uses a colormap record 30 that is different from any colormap 30 used by windows that it intersects which are lower in the layer tree.

If the changed window record 50 does not need a layer record 40 (step 132), the interface 14 first deassigns any layer record 40 the changed window record 50 had (step 134). Otherwise, if the changed window record 50 does require a layer record 40, the interface 14 assigns a layer record 40 or reorders an existing layer record 40 in the layer tree 22 for the changed window record 50 (step 133).

To assign or reorder a layer record 40, the interface 14 starts with the first layer record 40, i.e., the root of the layer tree 22. If the layer eligible field 54 in the corresponding window record 50 is set and the WCC 24 and PMC 25 are not full, the interface 14 locates the correct colormap record 30 for the window 50. Next, the interface 14 uses the contents of the boundaries field 52 in the window record 50 and sets the colormap ready field 56 also in the window record 50. The interface 14 then repeats the process on the next layer record 40 in the layer tree 22 and its corresponding window record 50 in the window tree 16.

Following steps 132–134, since other windows can be affected by a change request, the interface 14 determines whether any other window record 50 now needs a layer record 40 (step 136). For example, a window record 50 associated with layer record 40 that is positioned higher in the layer tree 22 and which intersects the changed window record 50 needs a layer record 40 if the window represented by the higher positioned window record 50 uses a different colormap record 30 than the changed window record 50. If another window record 50 now needs a layer record 40 (step 136), the interface 14 assigns a layer record 40 to the window record 50 (step 138).

To assign a layer record 40, the interface 14 creates a new layer record 40, determines the new layer record's position in the layer tree 22, inserts the new layer record 40 in the layer tree 22, and sets the layer eligible field 56 in the corresponding window record 50. In addition, in the colormap record 30 for the window represented by the window record 50 corresponding to the layer record 40, the interface moves the pointer to the window record 50 (found in window list 32) to the beginning of the window list 32 in the colormap record 30. Interface 14 repeats steps 136 and 138 for each window record 50 that needs a layer record 40.

Following steps 136 and 138, that is, once all window records 50 that need layer records 40 are provided with (assigned) layer records 40, the interface 14 determines if the layer tree 22 has changed (step 140). If so, the interface 14 loads the WCC 24 and PMC 25 (step 142) as described below.

To load the WCC 24 and PMC 25, the interface 14 begins with the highest layer record 40 in the layer tree 22, that is, the root of the layer tree 22. Then for each layer record 40 in the layer tree 22, if the layer eligible field 56 in the corresponding window record 50 is set and there is space left in the WCC 24 and PMC 25, the interface 14 locates the correct colormap 30 for the window represented by the window record 50 that corresponds to the layer record 40, or uses the default colormap 30, loads the contents of boundaries field 52 in the window record 50 into WCC 24 and PMC 25, and sets the right color field 58 in the window record 50.

Following step 142, that is, after the WCC 24 and PMC 25 are loaded, the interface 14 executes the request and returns to process the next request (step 144). Otherwise, if in step 140 the layer tree 22 did not change, the interface 14 executes the request and returns to process the next request (step 144).

While, the above description is limited to a specific embodiment of the present invention, it will be apparent that variations and modifications may be made to the invention with the attainment of some or all of the advantages of the invention. Therefore, it is the object of the following claims to cover all such variations and modifications as come within the true spirit and scope of the invention.

What is claimed is

1. In a display arrangement in a digital data processing system, an interface for controlling display of hierarchically-arranged display objects on a display and removal of said display objects from said display, at least one of said display objects having associated display criteria that are different from display criteria associated with another one of said display objects, said interface comprising:

A. means for determining the display criteria for each object, said display criteria including colormap information identifying a colormap to be used in displaying said object, each object identifying a relationship of its colormap with colormaps used for objects therebelow in the hierarchy, and B. means for maintaining a hierarchically-arranged layer control arrangement in response to the display criteria determined by the means for determining and the colormap relationship identified by each object, said layer control arrangement causing said display arrangement to display each of said hierarchically-arranged display objects in accordance with its associated display criteria so that the display criteria of one of said display objects are not used to display another one of said display objects having different display criteria when said one display object is removed from the display.

2. An interface as defined in claim 1 further comprising means for maintaining a tree-structured hierarchy of nodes and identifying said objects by said nodes in said tree-structured hierarchy, said means for maintaining generating said layer control arrangement in a tree-structured hierarchy in response to the hierarchy of said objects as identified by said nodes.

3. An interface as defined in claim 2 in which each node in said object hierarchy includes pointers to other nodes to identify a position of said node in said object hierarchy, said means for maintaining generating said tree-structured hierarchy of said layer control arrangement in response to said pointers.

* * * * *

UNITED STATES PATENT AND TRADEMARK OFFICE

CERTIFICATE OF CORRECTION

PATENT NO. : 5,142,615

DATED : August 25, 1992

INVENTOR(S) : Pamela L. Levesque et al.

It is certified that error appears in the above-identified patent and that said Letters Patent is hereby corrected as shown below:

Column 1, line 28, "network" should read --networks--.

Column 1, lines 53-54, "application" should read --applications--.

Column 3, line 64, before "value" insert --null--.

Column 5, line 28, "FIG. 2c" should read --FIG. 2d--.

Column 6, line 2, "4" should read --14--.

Signed and Sealed this

Thirty-first Day of May, 1994

Attest:

BRUCE LEHMAN

Attesting Officer

Commissioner of Patents and Trademarks